United States Patent Office 3,513,947
Patented May 26, 1970

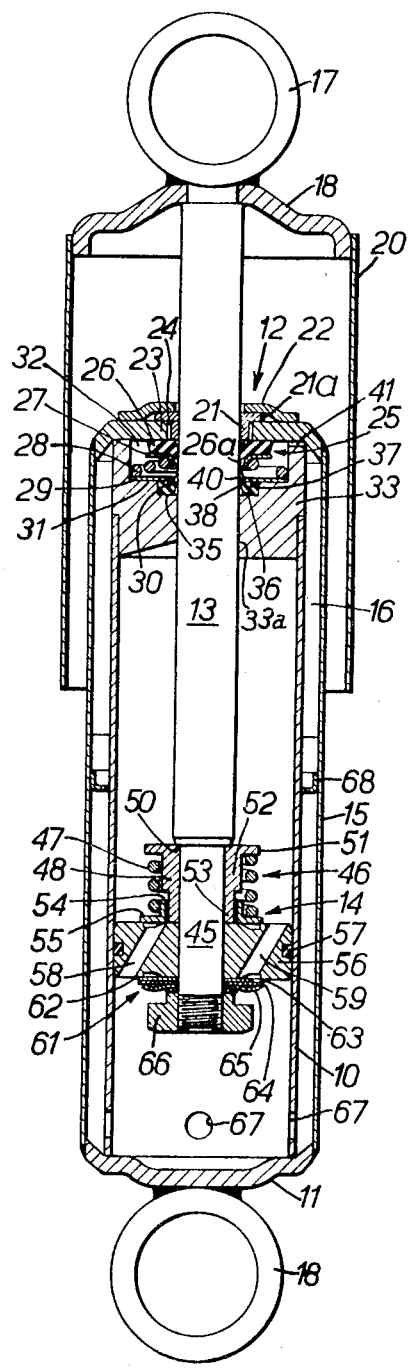

3,513,947
HYDRAULIC VIBRATION DAMPER
William A. Duckett, Kingsway, Ossett, England, assignor to Woodhead-Monroe Limited, Kingsway, Ossett, England, a British company
Continuation of application Ser. No. 527,715, Feb. 15, 1966. This application June 25, 1968, Ser. No. 742,964
Int. Cl. F16f 9/32
U.S. Cl. 188—100                                    2 Claims

ABSTRACT OF THE DISCLOSURE

A shock absorber of the telescopic hydraulic type includes a piston rod operating in a working cylinder and in which the piston is provided with through passageways for passing the working fluid from one side of the piston to the other. A second cylinder surrounding the working cylinder in spaced relation provides a reservoir for the working fluid and which is connected at its opposite ends to the corresponding ends of the working cylinder. The connection between the closed end of the working cylinder and the corresponding end of the reservoir is established by a plurality of passageways which do not excessively restrict flow of the fluid therebetween, and the connection between the opposite end of the working cylinder and the corresponding end of the reservoir, i.e. the end through which the piston rod passes, includes a chamber housing a seal for the piston rod, this chamber being ported to the reservoir and containing such of the working fluid that escapes into it along the surface of the piston rod from the working cylinder.

---

This invention relates to vibration dampers as used for example in vehicle suspension systems and more commonly called shock absorbers which term will be used herein for convenience and is a continuation of my previous application Ser. No. 527,715, filed Feb. 15, 1966, now abandoned.

The invention is concerned with shock absorbers of the pressurized type that is to say of the telescopic type comprising a working cylinder closed at one end, a piston arranged to slide in the cylinder and connected to a piston rod extending through a fluid seal in the other end, passages in the piston arranged to permit but afford resistance to flow of fluid from one side thereof to the other and in which the cylinder is filled with liquid and gas in direct contact and under pressure. In operation the liquid and gas mix to form an emulsion having a degree of elasticity such in relation to the resistance offered to flow through the appropriate passage or passages in the piston that, for movements of the piston relative to the cylinder in at least one direction there occurs additional compression of fluid on the appropriate side of the piston in company with decompression on the other side creating a pressure differential across the piston, and flow through the piston against the resistance offered by such passage or passages.

A shock absorber according to the present invention comprises a working cylinder closed at one end, a piston arranged to slide in the cylinder and connected to a piston rod extending through a fluid seal at the other end, passages in the piston arranged to permit but afford resistance to the flow of fluid from one side thereof to the other and a fluid reservoir in communication with the working cylinder, the reservoir and the spaces between the piston and the ends of the cylinder being filled with liquid and gas in direct contact and under pressure.

Preferably the working cylinder is surrounded by a concentric cylinder of larger diameter forming with it an annular chamber constituting the fluid reservoir.

The present invention is thus an improvement in shock absorbers of the "two tube" or other type, having a separate reservoir in communication with the working chamber. Previous constructions of two tube shock absorber which have been filled with liquid and gas and have been unpressurized have all been so constructed that the liquid and gas are maintained as separate as possible so that formation of emulsion is inhibited and so that only liquid is present in the working chamber. To this end the operation of these shock absorbers has been arranged to be such that the reservoir contains the gas exclusively so that the working cylinder contains only liquid and the damping is effected by valving in the piston controlling the flow of liquid therethrough and/or passages and valving controlling the flow of liquid from the working cylinder to the reservoir. To ensure that the working cylinder contains only liquid a non-return or recuperation valve has been placed in the path between the working cylinder and the reservoir, otherwise the shock absorber would tend to operate in an unpressurized mixture of liquid and gas which is entirely unsuitable as a damping fluid as most of the initial deflection of the piston would be spent in compressing the mixture rather than forcing it through the flow resistance damping valves and adequate pressure for providing significant damping would be achieved suddenly with the consequent generation of considerable shock. Shock absorbers with such non-return or recuperation valves cannot therefore work satisfactorily unless gas is excluded completely from the working cylinder and these have therefore been constructed in such manner as to ensure that liquid and only liquid is available at the opening to the recuperation valve. Such constructions have included the provision of a large reservoir so that rod displacement produces only a reasonably small change of fluid level and to inhibit the formation of the emulsion baffles in the reservoir and the provision of a tube or sleeve to direct the discharge from the seal cavity to a point below the surface of oil in the reservoir. In order to include all the constructional features necessary to obtain satisfactory operation of these devices therefore the units tend to be complicated, large and expensive.

A shock absorber according to the present invention is considerably simpler in operation than the previous construction and can be made much smaller since it operates perfectly satisfactorily with a mixture of gas and liquid both in the working chamber and in the reservoir and thus the reservoir can be made considerably smaller than has hitherto been necessary while further compactness is rendered possible by the omission of the non-return or recuperation valve and/or by the omission of any piston separating liquid and gas. The present invention works most satisfactorily if the liquid is substantially contained within the working cylinder while the gas is substantially contained within the reservoir but there is no necessity to ensure that liquid and only liquid is present in the working chamber while the gas is contained wholly within the reservoir.

According to a further feature of the present invention to ensure that this distribution of gas and oil takes place in the manner indicated, the working cylinder may be positioned in an upright position that is to say with its closed end lowermost and preferably formed for attachment to the unsprung mass of a vehicle on which it is to be employed and with the piston rod positioned uppermost and formed for attachment to the sprung mass of the vehicle. In an alternative arrangement the shock absorber may be maintained in the said upright position with the piston rod and cooling cylinder operating through levers and connected respectively to the unsprung and sprung masses of the vehicle. In other arrangements the working cylinder can then communicate with the reservoir through openings in the wall of the cylinder adjacent its closed end, and in a preferred embodiment the openings in the wall of the working cylinder are arranged as a plurality of small passages substantially uniformly distributed around the working cylinder and of such a total area as to be just adequate for permitting return of fluid from the reservoir to the working cylinder without excessive restriction. A number of small openings is preferred to one large opening because the small amount of substantially gas-free fluid contained within the reservoir is distributed generally uniformly around the periphery of the working cylinder.

A shock absorber according to the present invention is preferably provided with a fluid seal which comprises a housing containing a chamber extending around the piston rod having seals at its inner and outer ends, the inner seals permitting flow of fluid into the chamber from the interior of the cylinder but preventing its return thereto and the outer seal preventing flow of fluid out of the chamber but permitting flow of fluid into the chamber from outside the shock absorber so that the shock absorber may be charged under pressure, preferably by insertion in a pressurized gas chamber. The chamber in the seal preferably also communicates with the reservoir via a passage and this passage communicating with the reservoir conveniently opens into the upper end of the sealed chamber.

On example of the invention will now be described with reference to the accompanying drawing showing a sectional elevation through a telescopic hydraulic shock absorber according to the present invention in a plane containing the axis of the working cylinder.

The shock absorber comprises a working cylinder 10 closed at its lower end 11 and extending through a fluid sealing arrangement indicated generally at 12 in its upper end is a piston rod 13 having mounted on the lower end thereof a piston and valve arrangement generally indicated at 14. Surrounding the working cylinder 10 is a concentric cylinder 15 of larger diameter than the working cylinder and extending throughout its length to form with it and the working cylinder a fluid reservoir 16. The piston rod and cylinder carry sockets 17 and 18 for attachment respectively to the parts between which vibration is to be damped, for example, the sprung and unsprung parts of a vehicle. Mounted immediately below the upper socket 17 is the closed end 18 of a dirt shield 20 in the form of a concentric cylinder of slightly larger diameter than the concentric cylinder 15 and of such length that when the working cylinder and piston are in their fully extended positions its lower end still covers the upper end of the cylinder 15.

The fluid seal indicated generally at 12 comprises a dirt excluder in the form of an annular ring 21 coated with self lubricating material, such as sintered bronze, and has a radially directed flange 21a which is held between a retaining ring 22 and a generally cup shaped member 23 between which and the ring 21 is a small annular gap 24 to allow the ring 21 to move freely to take up its correctly aligned position with the piston rod 13 without radial pressure. The annular ring 21, in conjunction with the retaining ring 23, also serves to retain the upper end of a spring loaded oil seal assembly indicated generally at 25 comprising an outer seal in the form of a ring 26, of rubber or like resilient material, such as described in the present applicants British patent specification No. 920,959, and of generally frusto conical form, and having an inwardly and downwardly directed lip 26a pressing against the piston rod 13. The lower side of the ring 26 is held in place by retaining cup assembly 27 the inner diameter of which is slightly larger than the ring so that the lip 26a enters the gap between the cup 27 and the piston rod 13 and is pressed tightly into engagement therewith. Gas can thus enter downwardly past the lip 26a from the exterior of the shock absorber when it is being charged but is prevented from passing out. The cup 27 is urged upwards by a compression spring 28 the other end of which abuts against a washer 29, the internal diameter of which is greater than the piston rod to provide between it and the piston rod a gap 30. The underside of the washer 29 abuts against a shoulder 31 in a housing 33 forming the base of an annular chamber 32 in which is contained the sealing assembly 25. The housing 33 forms the upper end of the working cylinder 10 in the manner of a plug and also includes a central bore 33a forming a guide for the piston rod which passes through it. Below the washer 29 is a second smaller annular chamber 35 accommodating an inner seal in the form of a one-way sealing ring 36 of generally annular form and having an annular groove 37 in its upper surface and a tapering portion 38 in its inner surface forming between them an inwardly and upwardly directed lip 40 in tight engagement with the piston rod 13. The ring 36 therefore allows fluid escaping upwardly from cylinder 10 and around piston rod 13 in the annular working clearance between the latter and bore 33a to pass upwardly into the chamber 32 via the upwardly facing lip 40 but prevents its return. A passage 41 is provided in the housing 33 connecting the upper end of the fluid reservoir 32 to the upper end of the reservoir 16.

Thus the ring 26 forming the main seal is housed in an oil reservoir the substantially oil mixture in which is always kept at a level above the seal, as the overflow passage 41, the only means of escape for the oil is above the top of the seal. The ring 26 is preferably of some material such as synthetic rubber which is not affected by oil, to which it is impermeable and there is therefore not the problem assaociated with gas sealing where the materials of the seal tend to be permeable to gas to a small extent.

The piston assembly indicated generally at 14 is mounted on a pin 45 of slightly smaller diameter than the piston rod 13 and connected to its lower end, while associated with the piston is a compression relief valve assembly indicated generally at 46 to withstand violent shock loads and comprising a compression spring 47 inside which is a sleeve 48 the upper end of which abuts against the shoulder 50 formed between the pin 45 and the piston rod 13, and is in the form of a radially directed flange 51 to retain the upper end of the compression spring 47. The sleeve 48 is stepped at approximately its mid point so that the upper part 52 is of larger diameter than the lower part 53, the lower part being surrounded by an annular ring 54 having a radially directed flange 55, the ring being arranged to slide axially with respect to the lower part 53 of the sleeve 48. The compression spring 47 is retained at its lower end by the upper side of the flange 55. Mounted on the pin 45 below the sleeve 48 is a piston 56 having a piston ring 57 and provided with sets of openings 58 and 59 extending through it. The flow of fluid from the lower side to the upper side of the piston is controlled by the flange 55 acting as a valve which extends over the upper ends of the openings 58 but a gap is provided between the ring 54 and the lower end of the sleeve 48 to allow a limited flow or bleed without opening the valving. The flow of fluid from the upper side to the lower side of the piston is controlled by valving indicated generally at 61 comprising a metering spacer disc 62 having one or more bleed notches 63 in its periphery to allow for a limited flow or bleed through the valve without opening it. Below the disc 62 is a flat disc 64 acted upon by star or other suitably shaped spring 65. All the components mounted on the pin 45 are held by a retaining nut 66 screwed on to the end of the pin 45.

The design of the shock absorber thus ensures that the main seal 26 is effectively screened from violent shock loads, since on the extension stroke the only shock load which could reach the seal would be through a violent oil surge which is prevented since the annulus between the piston rod and the rod guide defined by the working clearance between piston rod 13 and its guide bore 33a is too small to permit such surges reaching the seal, while on the compression stroke shock loads are transmitted through the oil to the gas volume in the upper part of the chamber 16 and the small bleed notches communicating with the seal are too small to permit the impact velocities from reaching proportions dangerous to the seal itself.

The reservoir 16 is in communication with the lower end of the working cylinder 10 via parts 67 symmetrically arranged around the lower end of the working cylinder and which are of such diameter and number so that their total area is such as to be just adequate for permitting fluid between the reservoir and the working cylinder without excessive restriction. It is thus self-evident that the compression resistance damping effect of the shock absorber produced by movement of the piston within the working cylinder 10 is determined solely by displacement of the fluid in the working cylinder from one side of the piston to the other through the valve-controlled passageway 59 and the bleed opening 58. The reservoir 16 is provided with a locating ring 68 adjacent its centre to assist in assembly.

The manner in which the shock absorber operates is as follows. Assuming the shock absorber to be connected to sprung and unsprung parts of a vehicle in the position shown in the drawing, when it has been operated a few times say 6 to 8 i.e. 6 to 8 movements of the piston assembly with respect to the working cylinder, the gaseous part of the working fluid in the working cylinder is, largely at least, displaced upwardly around piston rod 13 through guide bore 33a and through the sealing ring 36 and past lip 40 into the chamber 32, through the passage 41 and into the reservoir 16 so that after these small number of movements the working cylinder tends to be completely filled with oil while the reservoir 16 has a column of oil at the bottom and a column of gas at the top. When the shock absorber is operated further the air and oil columns in the reservoir 16 start to amalgamate to form an emulsion in the reservoir while a solid column of oil remains in the working cylinder. The manner of operation of the emulsion and shock absorber is as hereinbefore set forth that is to say that, the emulsion in the reservoir 16 acts as an elastic hydraulic fluid so that while relative movement is restricted it can, in relation to the resistance offered by the hydraulic control valve, take place without fluid flow through the valves or with limited fluid flow less in volume than that represented by the piston displacement.

The piston therefore operates in a column of shock absorber fluid consisting substantially wholly of liquid while the emulsion is contained more or less completely in the reservoir 16. Although oil only is present in the working cylinder during most operations, no disadvantage is suffered if the emulsion formed in the reservoir enters the working cylinder and it is therefore possible to dispense with nonreturn or recuperation valves and a large reservoir which would otherwise have to be of a capacity sufficient to accommodate the greater proportion at least of the working liquid, to ensure that only oil were present at the opening to the recuperation valve.

I claim:

1. A shock absorber including an inner working cylinder having one end closed, a guide member forming a closure for the opposite end of said cylinder, a piston assembly arranged to slide in said cylinder and having passages therein permitting but affording resistance to flow of fluid from one side thereof to the other, a piston rod connected to said piston assembly and extending outwardly from said cylinder through a guide bore in said guide member, sadi guide bore terminating in an annular chamber formed in said guide member, a seal structure tightly surrounding said piston rod and which serves to prevent discharge of fluid outwardly from said annular chamber along the piston rod, the working clearance between said piston rod and guide bore serving to permit discharge of fluid from said working cylinder into said annular chamber, an outer cylinder concentrically surrounding said inner working cylinder in radial spaced relation to establish an annular fluid reservoir of constant capacity, means forming a first passageway between said annular chamber in said guide member and the corresponding end of said reservoir for fluid flow from said annular chamber into said reservoir, and means forming a second passageway between the other end of said working cylinder and the corresponding end of said reservoir, the cross sectional area of said second passageway being such as to permit flow of fluid between said reservoir and the underface of the piston in said working cylinder without excessive restriction, and said reservoir and working cylinder being filled with liquid and gas in direct contact under pressure whereby the compression resistance damping effect produced by movement of said piston within said working cylinder is determined solely by displacement of the fluid in the working cylinder from one side of the piston to the other through said passages therein.

2. A shock absorber as defined in claim 1 wherein said second passageway is constituted by a plurality of circumferentially spaced ports in the wall of said working cylinder.

References Cited

UNITED STATES PATENTS

| 2,048,037 | 7/1936 | Smith. |
| 2,214,038 | 9/1940 | Beecher. |
| 3,236,339 | 2/1966 | Duckett. |

FOREIGN PATENTS

| 678,804 | 9/1952 | Great Britain. |

GEORGE E. A. HALVOSA, Primary Examiner